United States Patent [19]
Healey

[11] Patent Number: 5,548,760
[45] Date of Patent: Aug. 20, 1996

[54] MESSAGE HANDLER

[75] Inventor: Roger K. Healey, Manchester, England

[73] Assignee: International Computers Limited, London, England

[21] Appl. No.: 513,662

[22] Filed: Aug. 10, 1995

Related U.S. Application Data

[63] Continuation of Ser. No. 315,826, Sep. 30, 1994, abandoned.

[30] Foreign Application Priority Data

Nov. 11, 1993 [GB] United Kingdom ...................... 932324

[51] Int. Cl.$^6$ ...................................................... G06F 9/46
[52] U.S. Cl. .................................. 395/650; 364/DIG. 1; 364/281.3; 364/281.7; 364/281.8
[58] Field of Search ............................................... 395/650

[56] References Cited

U.S. PATENT DOCUMENTS

| | | | |
|---|---|---|---|
| 4,325,120 | 4/1982 | Colley et al. | 395/375 |
| 4,387,427 | 6/1983 | Cox et al. | 364/200 |
| 4,847,754 | 7/1989 | Obermarck et al. | 395/650 |
| 5,210,873 | 5/1993 | Gay et al. | 395/650 |
| 5,222,217 | 6/1993 | Blount et al. | 395/325 |
| 5,224,215 | 6/1993 | Disbrow | 395/250 |
| 5,274,819 | 12/1993 | Blomfield-Brown | 395/700 |
| 5,283,856 | 2/1994 | Gross et al. | 395/51 |
| 5,371,850 | 12/1994 | Belsan et al. | 395/200 |
| 5,371,871 | 12/1994 | Spilo | 395/425 |

OTHER PUBLICATIONS

Bahr et al. "Architecture, design, and performance of Application System/400 (AS/400) multiprocessors", IBM Journal of Research Development Nov. 1992, V36, n6.

2421 Radio Fernsehen Elektronik, vol. 32 (1983) Marz, No. 3, Ost–Berlin, DDR, "Synchronisation paralleler Prozesse in Mehrmikrorechnersystemen".

IBM Technical Disclosure Bulletin, vol. 35, No. 2, Jul. 1992.

Microsoft Systems Journal, Jan.–Feb. 1992, "Strategies and Techniques for Writing State–of–the–Art TSRs that Exploit MS–DOS 5".

Real–Time Microcomputer System Design, by Peter D. Lawrence, Konrad Mauch, pp. 482–495.

Stevens, Richard W., "Advanced Programming in The Unix Environment, Addison–Wesley", pp. 453–457, 1992.

*Primary Examiner*—Kevin A. Kriess
*Assistant Examiner*—St. John Courtenay, III
*Attorney, Agent, or Firm*—Lee, Mann, Smith, McWilliams, Sweeney & Ohlson

[57] ABSTRACT

A computer system has a message handler for passing messages between processes. The message handler makes use of a message queue and a process queue. The message queue holds a list of messages between the processes, arranged in chronological order according to the length of time each message has been waiting for delivery. The process queue holds a list of processes that have requested messages, arranged in chronological order according to the length of time each process has been waiting for a message. The message handler searches the queues to find the earliest process in the process queue that currently has a message queued for it, and to find the earliest message in the message queue currently queued for that process, and then passes that message to that process. The message handler may be implemented as a TSR (Terminate and Stay Resident) process, running under a single-thread operating system.

2 Claims, 1 Drawing Sheet

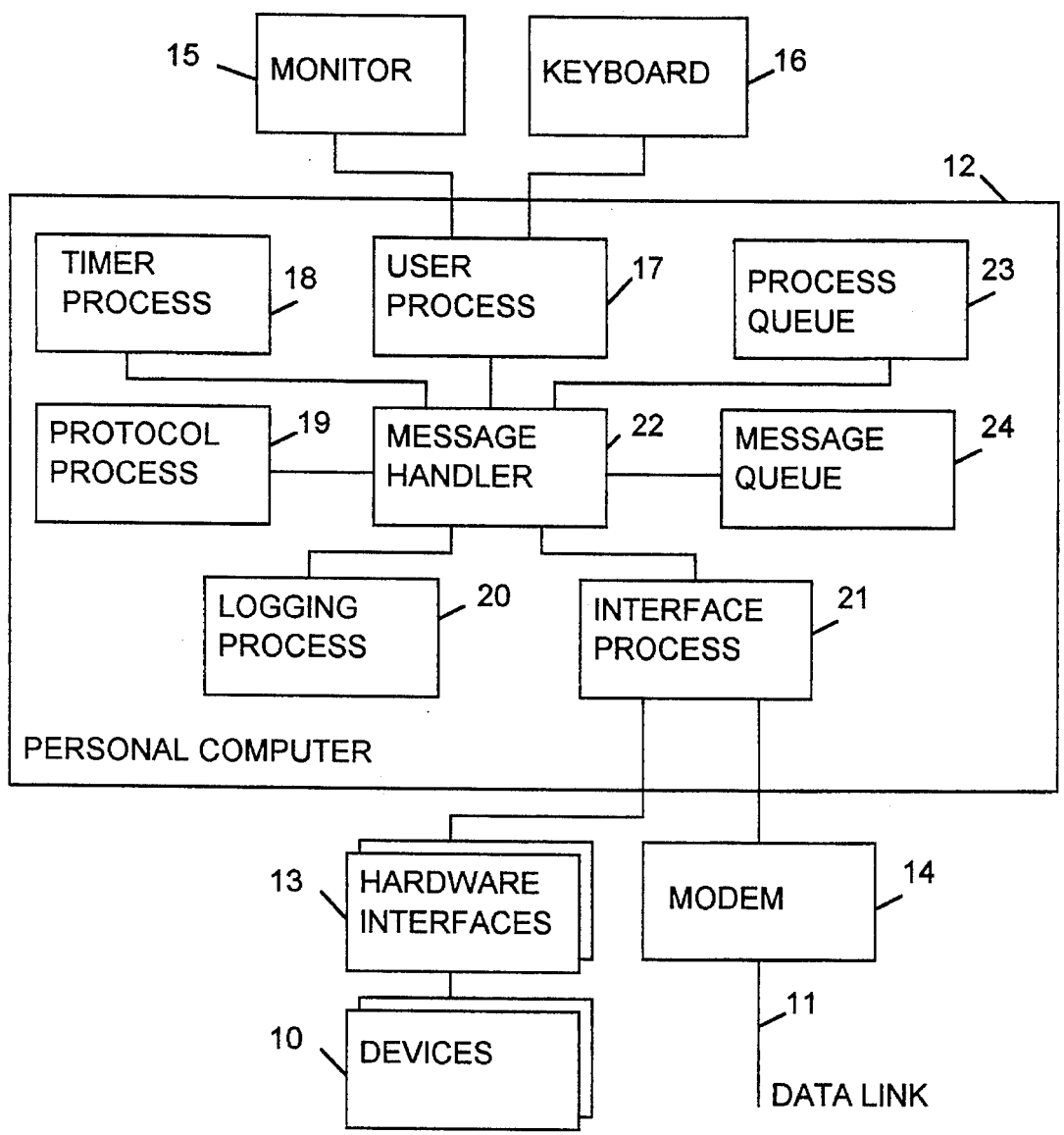

MESSAGE HANDLER

This application is a continuation of application Ser. No. 08/315,826, filed Sep. 30, 1994 now abandoned.

BACKGROUND OF THE INVENTION

This invention relates to a message handler for passing messages between processes or tasks running in a computer system. The invention is particularly, although not exclusively, concerned with a message handler suitable for running as a TSR (Terminate and Stay Resident process) under a single-thread operating system such as the MS-DOS operating system.

SUMMARY OF THE INVENTION

According to the invention there is provided a computer system comprising:

(a) means for running a plurality of processes, (b) a message queue for holding a list of messages between the processes, arranged in chronological order according to the length of time each message has been waiting for delivery, (c) a process queue for holding a list of processes that have requested messages, arranged in chronological order according to the length of time each process has been waiting for a message, and (d) a message handler comprising means for searching the queues to find the earliest process in the process queue that currently has a message queued for it, and to find the earliest message in the message queue currently queued for that process, and for passing that message to that process.

BRIEF DESCRIPTION OF THE DRAWINGS

The drawing is a block diagram of a computer system, comprising a number of processes, including a message handler process.

DESCRIPTION OF AN EMBODIMENT OF THE INVENTION

One embodiment of the invention will now be described by way of example with reference to the accompanying drawings.

Referring to the drawing, the embodiment of the invention to be described is a PC-based communications concentrator, for making connections between a number of hardware devices 10 and a data link 11. The data link is connected to a remote computer (not shown) for monitoring and interrogation of the devices. The concentrator comprises a standard personal computer (PC) 12, running under the MS-DOS operating system. The PC is connected to the hardware devices 10 by way of a number of hardware interfaces 13, and is connected to the data link 11 by way of a modem 14. The system also includes a monitor 15 and keyboard 16.

The computer runs a user process 17 and several utility processes, including a timer process 18, a protocol process 19, a logging process 20, and an interface process 21. The user process is responsible for the overall control of the system. It maintains a screen display showing the current status of all the hardware devices 10, and monitors the keyboard for user input. It also issues regular requests for status to the hardware devices, and establishes connections over the data link through the modem. The timer process is responsible for generating timer messages for the other processes. The protocol process is responsible for handling the protocol for the data link. The logging process maintains logging files for use by the user process. The interface process provides an interface with the hardware interfaces.

The system also includes a message handler process 22, which is responsible for routing messages between the processes 17-21, suspending processes waiting for messages, and rescheduling processes when messages become available for them. Each of the processes 17-21 is a separate DOS process with its own process state. The message handler must preserve this state on process suspension and reinstate it when the process is reactivated. The message handler must also manage stack switching between the various processes, including itself. The message handler makes use of two data structures: a process queue 23 and a message queue 24.

The user process 17 is implemented as a conventional DOS program. The message handler 22 and the processes 18-21, on the other hand, are implemented as TSRs (Terminate and Stay Resident processes), so that they can effectively run concurrently with DOS and the user process. Reference is made to the following publications for information on the implementation of TSRs:

Schulman et al.: "Undocumented DOS"; pub.Addison-Wesley.

Michael J. Young: "Systems Programming with Microsoft C"; pub. Sybex.

Microsoft Macro Assembler Programmers Guide

"Strategies and Techniques for Writing State-of-the Art TSRs that Exploit MS-DOS Version 5"; Microsoft System Journal Jan-Feb 1992.

Each of these TSRs may be entered asynchronously at an arbitrary time, and interrupts the current process. This interruption occurs without DOS being aware of it: as far as DOS is concerned the code that is running is either DOS's own code or the code of the program that was last loaded. It is therefore important to ensure that when a TSR runs, it does not interfere with the operation of DOS or with any critical BIOS functions. The way in which this problem is handled is as follows.

The TSR discovers whether or not DOS is currently busy by using a flag provided by DOS, referred to as the "In DOS" flag. Each TSR, when it is first installed, obtains the address of this flag by calling a DOS function, and uses this address to test the flag whenever it is invoked. If the flag value is zero, it is safe for the TSR to proceed. If on the other hand the flag value is non-zero, this means that DOS is busy and so the TSR exits.

The TSR determines whether the BIOS is busy by intercepting selected interrupt calls to the BIOS, incrementing a control counter on entry and decrementing it on exit. Whenever the TSR is invoked, it checks the value of this counter. If the counter is non-zero, this means that a critical BIOS function is in progress and so the TSR exits. The interrupts that the TSR needs to intercept are 10(hex) for the video, 13(hex) for the disk, and 16(hex) for the keyboard. Additionally, the TSRs must also monitor the use of interrupt 14(hex), since this is used, in this embodiment, to communicate with the modem. When the TSR is first installed, it replaces the interrupt vectors for these interrupts with vectors that point to routines within the TSR, for incrementing and decrementing the control counter as required.

When the TSR is invoked it also checks an activity flag, which indicates whether the TSR is already active. If this flag is true, the TSR is already active, and so the TSR exits. If on the other hand the flag is false, the TSR sets it to true and continues. This flag checking is a critical region of code and is performed with the interrupts inhibited.

When a TSR is activated, it initially runs on the stack of the interrupted process. Assuming that all the above checks are satisfactory, the TSR then switches to its own internal stack. The TSR must preserve sufficient information about the interrupted process so that it can switch back to that process prior to terminating. This information includes at least the process identifier (PID), and the disk transfer area (DTA) of the interrupted process, and the interrupt vectors 1B(hex), 23(hex) and 24(hex) for the Ctrl-Break, Ctrl-C and Critical Error interrupts. This information is replaced with the TSR's own data. The PID and DTA of the TSR are determined when the TSR is first installed. The interrupt vectors for the Ctrl-Break and Ctrl-C interrupts are replaced by pointers to functions which simply return. The interrupt vector for the Critical Error interrupt is replaced by a pointer to a function which returns with the AX register set to 3. This prevents DOS from processing the error.

TSRs (such as the logging process) that intend to perform any disk activity must also preserve the current drive and directory, and the extended error information, and must reinstate this data on termination.

The Multiplex Interrupt (interrupt 2F(hex)) provides a way for any process to verify the presence of an installed TSR and to exchange information with it. When a TSR is first installed, its installation code retains the current contents of the 2F interrupt vector, and replaces it with a pointer to a new multiplex handler. Thus, the multiplex handlers of the installed TSRs are chained together: the current contents of the 2F interrupt vector point to the first multiplex handler in the chain, and each retained value of the 2F interrupt vector points to the next multiplex handler in the chain. A process communicates with a TSR by calling the 2F interrupt, with the identity of the target TSR in the AH register and a function code in the AL register. As the multiplex handler of each TSR gains control, it compares the value in AH with its own identity number. If they are not equal, this TSR is not the target, and so the multiplex handler passes control to the next multiplex handler in the chain, via the address retained from the 2F interrupt vector at installation time.

Process Queue

The process queue consists of a linked list of entries, with head and tail pointers pointing to the head and tail of the list. Each entry represents a process that has requested a message. The entries are arranged in chronological order, according to the length of time each process has been waiting for a message, with the process that has been waiting longest at the head of the queue. Each entry contains the following information.

The process identity.

The process's stack segment number.

The process's stack base and stack top.

A far pointer to the process's disk transfer area (DTA).

Copies of the process's interrupt vectors 1B(hex),23(hex) and 24(hex).

The process's current drive and current directory.

A pointer to the next entry in the process queue.

Message Queue

The message queue consists of a linked list of entries, with head and tail pointers pointing to the head and tail of the list. Each entry represents a message from a source process, waiting to be delivered to a destination process. The entries are arranged in chronological order according to the length of time each message has been waiting to be delivered, with the oldest message (i.e. the message that has been waiting longest for delivery) at the head of the queue. Each message contains the following information.

The identity of the source process.

The identity of the destination process.

The message type and length.

A pointer to a message buffer that holds the message data.

A pointer to the next entry in the message queue.

Message Handler

As mentioned above, all processes communicate with each other by sending messages by way of the message handler. Processes send requests to and receive responses from the message handler by means of the DOS Multiplex Interrupt. The way in which the TSRs are chained to this interrupt has been described above.

When one of the processes has a message to send to another process, it sends a send message request to the message handler. In response to this request, the message handler adds the message to the tail of the message queue.

Messages may be retrieved from the message queue in two different ways: by a read message request, or by a check message request. The check message function is the only method available to interrupt-driven processes, i.e. the interface and timer processes. The user, protocol, and logging processes may use either method.

In response to a check message request, the message handler searches the message list for a message for the requesting process and, if one is found, returns the message to the process. The message is removed from the message queue. If no message is found, the message handler informs the process that no message is currently available for it.

In response to a read message request. The message handler first creates an entry for the process that made the request and links it to the tail of the process queue. The process is then suspended, its process state being saved in the entry in the process queue.

The message handler then scans the process queue, starting from the head of the queue, i.e. the process that has been waiting longest for a message. For each process in the queue, the message handler scans the message queue, starting from the head of the queue, looking for a message for that process. This loop continues until a message is found for a particular process, whereupon that process is reactivated, the message is returned to it, and the message handler exits. In other words, the message handler searches the queues to find the earliest process in the process queue that currently has a message queued for it, and to find the earliest message in the message queue currently queued for that process.

The embodiment described above provides a sophisticated message passing system, controlled by the message handler. The activation and suspension of the various processes in the system is under the control of the message handler, which allows the system to react to messages in real time, and to route messages.

I claim:

1. A computer system comprising:

(a) means for running a plurality of processes;

(b) a message queue, having a head and a tail;

(c) a process queue, having a head and a tail; and
(d) a message handler comprising:
  (i) means responsive to a request from a source process having a message to send, for adding said message to the tail of the message queue along with a destination process identity for said message;
  (ii) means responsive to a request from a destination process, indicating that said destination process is ready to receive a message, for adding an entry identifying said destination process to the tail of said process queue and then suspending said destination process;
  (iii) means for performing a scan of the process queue, starting from the head of the process queue and, for each process in the process queue, performing a scan of the message queue, starting from the head of the message queue, until a message/process pair is found comprising a particular process and a particular message that is destined for said particular process; and
  (iv) means for activating said particular process and for passing said particular message to said particular process.

2. A method of passing messages between processes in a computer system, the method comprising steps as follows:

(a) maintaining a message queue, having a head and a tail;
(b) maintaining a process queue, having a head and a tail; and
(c) adding messages from source processes to the tail of the message queue along with destination process identities for said messages;
(d) when a destination process is ready to receive a message, adding an entry identifying said destination process to the tail of said process queue and then suspending said destination process;
(e) performing a scan of the process queue, starting from the head of the process queue and, for each process in the process queue, performing a scan of the message queue, starting from the head of the message queue, until a message/process pair is found comprising a particular process and a particular message that is destined for said particular process;
(f) activating said particular process; and
(g) passing said particular message to said particular process.

* * * * *